Nov. 11, 1952     T. S. GORTON     2,617,532
APPARATUS FOR SEPARATING ICE FROM ICE-PACKED FISH
Filed Aug. 24, 1949     2 SHEETS—SHEET 1
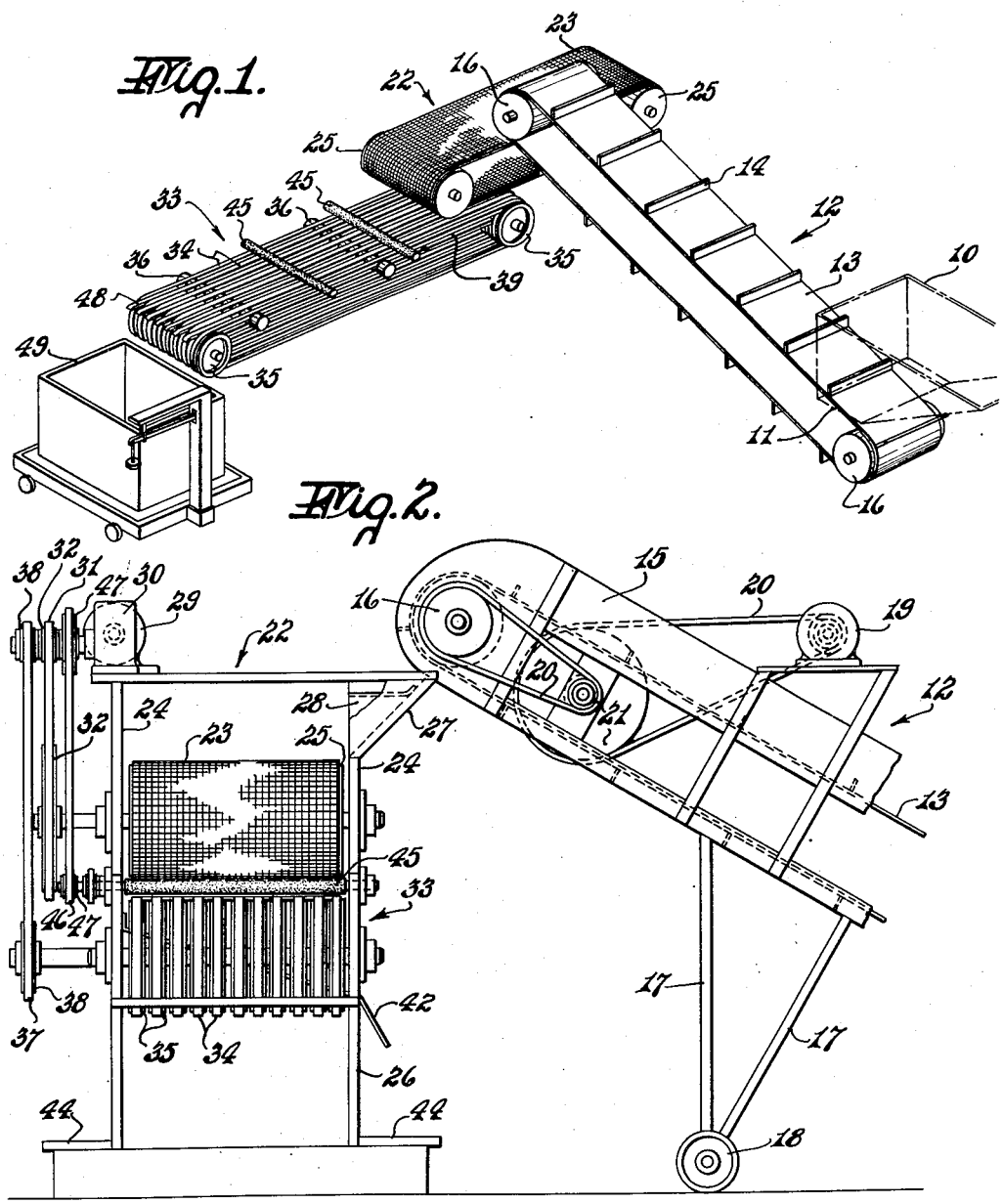
INVENTOR
THOMAS S. GORTON
BY Chapin & Neal
ATTORNEYS

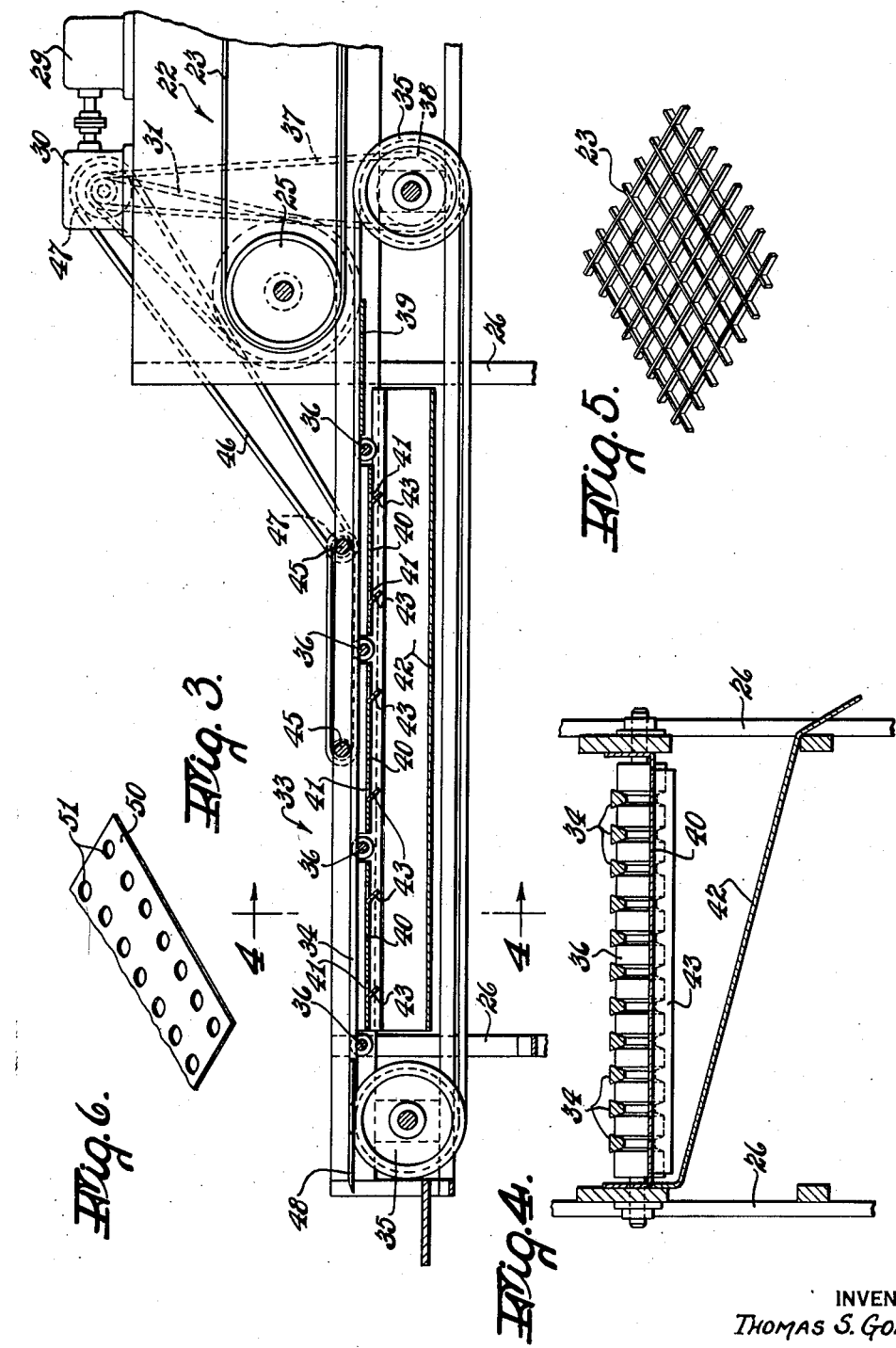

Patented Nov. 11, 1952

2,617,532

UNITED STATES PATENT OFFICE 2,617,532

APPARATUS FOR SEPARATING ICE FROM ICE-PACKED FISH

Thomas S. Gorton, Evanston, Ill.

Application August 24, 1949, Serial No. 112,147

3 Claims. (Cl. 209—247)

This invention relates to a machine for separating ice from ice-packed fish.

An object of this invention is to provide a machine for rapid dockside handling of freshly caught and iced fish and to remove ice and trash from the merchantable fish so that the fish alone may be weighed and purchased.

Another object of the invention is to provide a de-icer which will handle fish gently yet which will do the work of ice separation.

A further object of the invention is to provide a machine for taking out small unmerchantable fish and trash along with the ice from the iced catch.

Still another object of the invention is to provide a machine which is economical to build and operate yet rugged and serviceable for long hard use.

Other objects and advantages will be apparent from the following description of a preferred form of the invention as shown by the accompanying drawings.

In the drawings:

Fig. 1 is a schematic pictorial view of a de-icing machine embodying the features of my invention;

Fig. 2 is an end elevation of the machine illustrated in Fig. 1;

Fig. 3 is a side elevation of a portion of the machine;

Fig. 4 is a section on line 4—4 of Fig. 3;

Fig. 5 is a fragment in perspective of the mesh wire screen of one of the conveyer belts; and Fig. 6 is a perspective of a perforated tray insert for use with one of the conveyors.

Referring to Fig. 1, 10 indicates a hopper into which is dumped loads from the iced catch as it comes from the hold of a fishing vessel with ice, trash, and small and unmerchantable fish mixed with the merchantable fish.

At the bottom of hopper 10 is an outlet 11. Beneath the outlet is a slatted belt conveyor or escalator 12 having a wide belt 13 with spaced, laterally disposed slats 14, side boards 15 (Fig. 2) and belt driven end rollers 16.

Escalator 12 is sharply inclined upwardly from the hopper outlet to elevate the contents of the hopper dropping through outlet 11 onto the belt 13. Supporting struts 17 (Fig. 2) for the escalator assembly carry rotatable caster wheels 18 so as to permit easy moving of the same.

The slatted belt 13 is driven by a motor 19 (Fig. 2) connected with the upper end roller 16 as by speed reduction belts 20 and pulleys 21.

Beneath the outlet end of conveyor 12, and vertically spaced therefrom is a belt conveyor 22 having a wide wire mesh screen belt 23, stationary sides 24 and end rollers 25. Conveyor 22 is directed in a path transverse to the direction of escalator 12.

Conveyor 22 is level or substantially so and is supported by structural framework 26. A flanged apron or chute 27 is formed in the stationary side 24 of conveyor 22 immediately below the upper end of the escalator 12. A deflecting hood or spreader 28 is fixed centrally in the chute leading to the wire mesh belt so that as fish, ice and trash fall from the escalator the deflector 28 separates and spreads the same on screen belt 23.

Screen belt 23 (see Fig. 5) is made of sufficiently large mesh to allow ice shattered from the fall, broken bits of ice or fish, tiny fish and trash to fall through the openings. The openings will not of course receive merchantable fish and they should not be large enough to catch any parts of the fish body. In practice openings substantially one inch square or slightly larger have proven most satisfactory.

Screen belt conveyor 22 is driven by a motor 29 connected with one of its end rollers 25 through a gear speed reducer 30, and speed reduction belts 31 and pulleys 32.

Vertically spaced beneath the front end of screen conveyor 22 is a substantially horizontal conveyor table 33 having a series of laterally spaced endless V-belts 34 extending between grooved end rollers 35. V-belt guide rollers 36 hold the belts in proper longitudinal alignment between the rollers 35. In practice, the belts are spaced approximately 1½ inches apart. Roller 35 at the inner end of table 33 is driven as by a belt 37 (Fig. 2), the speed reducer 30 and pulleys 38.

The vertical drop from the outlet end of screen belt 22 to traveling table 33 further separates and shatters ice from the merchantable fish. Underneath the V-belts of the table at the location of the drop is a closely spaced flat sheet 39 to insure that the fish are flatly disposed on the belts of the table.

A flat pan 40 (Fig. 3) underlies the V-belts throughout the remainder of the length of table 33. Pan 40 need not be spaced as close to the underside of the V-belts as sheet 39 since there is no direct vertical drop of fish beyond sheet 39. Pan 40 is provided with transverse openings 41 through which ice, small unmerchantable fish and trash falling through the V-belts drop onto a downwardly slanting apron 42 (Fig. 4) for disposal at one side of the table. At the front edge of each opening 41 (Fig. 3) is a downwardly and rearwardly inclined flange 43 to prevent the larger, merchantable fish from being caught in the openings. The fish may be conveyed by the V-belts with its tail or fins for example falling onto the pan between the V-belts.

The flange will, of course, permit the depending part of then fish to ride over the forward edge of the opening 41. In the drawings the pan 40 comprises a series of plates positioned between the guide rolls 36.

Table 33 is of substantial width with stationary side boards and is supported by the structural framework 26. A raised platform 44 (Fig. 2) at each side of the table and the screen belt conveyor 22 is provided for operators to stand upon, and pick out the larger chunks of ice and any pieces of trash and unmerchantable fish which pass by with the fish.

Small, rough surfaced rollers 45 (Figs. 1 and 3) are located slightly above the V-belts 34 as shown. Driven from motor 29 as by belts 46 and pulleys 47, rollers 45 are designed to travel at a faster rate of speed than the V-belts as will be described.

Long wooden fingers 48 (Figs. 1 and 3) at the end of the traveling table 33 and between the V-belts 34 extend beyond the forward edge of roller 35 to prevent fish from being caught under the belts at the outlet of the apparatus. The fingers provide a shelf over which the fish are pushed to fall into a weighing box 49 (Fig. 1).

In some instances a particular catch of fish, such as mackerel or whiting, will include fish which are mechantable but smaller than the size handled in the usual course of processing a catch. In such case there is provided a perforated plate 50 as shown by Fig. 6 which may be placed over each of the transverse openings 41 in the pan 40. The perforations 51 in plate 50 are approximately one and one-half inches in diameter which will be sufficient for passage of small ice and trash but will not permit passage of small fish of a thin shape which slip between the belts. These fish may be collected from the pan after the main operation of the machine and be cleaned and processed separately.

In operation the apparatus handles the ice packed fish as follows: The fish are loaded into baskets in the hold of a vessel, raised, and dumped into the hopper 10. The hopper is intended to be of a size large enough to receive several loads from the hold in the event the conveyors are temporarily shut down for any reason. The contents of the hopper then slide from the outlet of the hopper onto the escalator which continuously receives small amounts of fish, ice, and trash. The slats assist in raising the packed fish to the top of the escalator and if desired the largest pieces of ice may be manually picked off.

The contents of the escalator fall onto the apron 27 and hit spreader 28. The fish and other matter are spread onto screen belt 23 of the conveyor 22 at each side of and over the top of spreader 28. The dropping of the fish is sufficient to dislodge some of the ice stuck in gills or mouths or otherwise clinging to the fish. It is not a sufficient drop to damage the fish. And by spreading the fish received on the conveyor 22, small bits of ice and trash are freed to pass through the mesh.

The escalator is preferably driven at a slightly greater rate of speed than the wire screen so as to utilize the screen surface by a continuous spread of fish and ice from slats 14.

Inevitably a portion of the ice and trash is not separated in the first drop onto the wire screen. At the end of the screen belt another vertical drop is provided onto the table 33. This further dislodges ice from the fish. It is to be especially noted also that the driving arrangement of the V-belts on conveyor table 33 is to provide an appreciably higher rate of speed than the speed of the screen belt conveyor 22. By so doing the fish are spread out to a still greater extent on the moving V-belts. The debris, small ice and trash, has thus a greater chance to fall through the open spaces between the belts. Along the table the larger pieces of ice and any trash may be manually removed.

At the locations of the small rollers 45 provided with roughened surfaces the fish are flipped along the table. The rollers are in practice driven at about twice the speed of the belts so that as the fish come in contact therewith the rough surfaces of the rapidly moving rollers flip the fish and kick them along the table. This quick flip of the fish further dislodges any ice that may be clinging in the fish mouths or gills.

The fish to be processed are discharged into the weighing box 49 and when the catch is weighed it is substantially free of ice and trash. Only merchantable fish are paid for.

Having disclosed my invention, I claim:

1. Apparatus for separating merchantable fish from ice and trash in which said fish are packed comprising in combination an inclined lifting conveyor having a continuously movable flat supporting surface, means to drive said conveyor in an upwardly directed movement, a second conveyor at the upper end of the first conveyor disposed transversely to it, the surface of said second conveyor being vertically spaced from and below the upper end of the first conveyor, said second conveyor having openings therein for passage of relatively small pieces of ice and trash therethrough, driving means for said second conveyor, a conveyor table aligned with and located below the end of said second conveyor, said conveyor table having a series of closely spaced endless belts forming a movable table surface, a flat horizontally disposed platform plate immediately adjacent the underside of said belts on the upper run thereof in backing relation thereto and closing the spaces through the belts, said belts being positioned at the end of the table directly beneath the end of the second conveyor and holding fish dropped on the belts from passage between the belts and flatly disposing them relative to said belts for carriage along said table, a pan surface construction beyond said plate surface and underlying the upper run of said endless belts to receive ice and trash dropped between the belts, and means to drive the belts over the pan surface in a direction away from said flat plate surface.

2. A conveyor table for separating merchantable fish from ice and trash in which said fish are packed comprising a series of closely spaced endless belts forming a movable table surface, a pan surface construction underlying the upper run of said endless belts to receive ice and trash dropped between the belts, said pan surface having transverse openings therein to allow ice and trash to fall from the pan surface, a flat horizontally disposed platform plate immediately adjacent the underside of the belts on the upper run thereof in backing relation thereto and closing the spaces through the belts, said plate being positioned at one end of said table and holding fish dropped on the belts from passage between the belts and flatly disposing them relative to said belts for carriage along said table, and means to drive the belts along the table over said pan surface in a direction away from said flat horizontally disposed plate.

3. A conveyor table for separating merchantable fish from ice and trash in which said fish are packed comprising a series of closely spaced endless belts forming a movable table surface, rollers at each end of the table to carry the belts stationary fingers at the forward end of the table and between the belts extending beyond the forward edge of the rollers, a pan surface construction underlying the upper run of said endless belts to receive ice and trash dropped between the belts, said pan surface having transverse openings therein to allow ice and trash to fall from the pan surface, a flat horizontally disposed platform plate immediately adjacent the underside of the belts on the upper run thereof in backing relation thereto and closing the spaces through the belts, said plate being positioned at one end of said table and holding fish dropped on the belts from passage between the belts and flatly disposing them relative to said belts for carriage along said table, means to drive the belts along the table in a direction away from said flat horizontally disposed plate and toward said fingers, and longitudinally spaced rollers of small uniform diameter having frictional surfaces transversely overlying said belts and immediately adjacent the upper surfaces thereof, and means to drive said rollers rapidly in the same direction as said table to flip fish along said table.

THOMAS S. GORTON.

REFERENCES CITED

The following references are of record in the file of this patent:

UNITED STATES PATENTS

| Number | Name | Date |
|---|---|---|
| 729,395 | Niemann | May 26, 1903 |
| 831,936 | Crawford | Sept. 25, 1906 |
| 864,828 | Callow | Sept. 3, 1907 |
| 1,050,730 | Fredrickson | Jan. 14, 1913 |
| 1,189,167 | Parker | June 27, 1916 |
| 1,251,735 | Bannon et al. | Jan. 1, 1918 |
| 1,348,783 | Curley | Aug. 3, 1920 |
| 1,353,075 | Sibley | Sept. 14, 1920 |
| 1,356,852 | Clark | Oct. 26, 1920 |
| 1,432,738 | Alwart | Oct. 24, 1922 |
| 1,661,657 | Grabill | Mar. 6, 1928 |
| 1,665,181 | Silver | Apr. 3, 1928 |
| 1,841,333 | Kyle | Jan. 12, 1932 |
| 1,946,805 | Mojonnier | Feb. 13, 1934 |
| 2,010,335 | Stoltenberg | Aug. 6, 1935 |
| 2,156,878 | Sinden | May 2, 1939 |
| 2,292,068 | Grayson | Aug. 4, 1942 |
| 2,314,479 | Christiansen | Mar. 23, 1943 |
| 2,350,691 | Mauroner | June 6, 1944 |
| 2,426,953 | Smith | Sept. 2, 1947 |